(12) United States Patent
Heine et al.

(10) Patent No.: US 7,708,805 B2
(45) Date of Patent: May 4, 2010

(54) METHOD OF PRODUCING CARBON FIBERS, AND METHODS OF MAKING PROTECTIVE CLOTHING AND A FILTER MODULE

(75) Inventors: Michael Heine, Allmannshofen (DE); Richard Neuert, Hohenreichen/Wertingen (DE); Rainer Zimmermann-Chopin, Dornstadt (DE)

(73) Assignee: SGL Carbon AG, Wiesbaden (DE)

( * ) Notice: Subject to any disclaimer, the term of this patent is extended or adjusted under 35 U.S.C. 154(b) by 567 days.

(21) Appl. No.: 11/656,259

(22) Filed: Jan. 22, 2007

(65) Prior Publication Data

US 2007/0132128 A1    Jun. 14, 2007

Related U.S. Application Data

(62) Division of application No. 10/463,018, filed on Jun. 17, 2003, now abandoned.

(30) Foreign Application Priority Data

Jun. 17, 2002   (DE) ................. 102 26 969

(51) Int. Cl.
*D01F 9/12*   (2006.01)
(52) U.S. Cl. ............... 95/139; 423/230; 423/447.6
(58) Field of Classification Search .......... 423/230, 423/447.6; 95/139
See application file for complete search history.

(56) References Cited

U.S. PATENT DOCUMENTS

| | | | |
|---|---|---|---|
| 3,111,396 A | 11/1963 | Ball | |
| 3,628,984 A | 12/1971 | Ishikawa | |
| 3,666,526 A | 5/1972 | Ettinger et al. | |
| 3,922,334 A | 11/1975 | Marek et al. | |
| 3,925,524 A * | 12/1975 | Kimmel et al. | 423/447.4 |
| 4,067,956 A | 1/1978 | Franklin et al. | |
| 4,100,314 A | 7/1978 | Wallouch | |
| 4,220,846 A | 9/1980 | Rice et al. | |
| 4,362,646 A | 12/1982 | Ikegami et al. | |
| 4,671,950 A * | 6/1987 | Ogawa et al. | 423/447.1 |
| 5,089,135 A | 2/1992 | Yoneyama et al. | |
| 5,763,103 A * | 6/1998 | McCullough | 428/394 |
| 5,895,716 A | 4/1999 | Fiala et al. | |
| 6,364,936 B1 | 4/2002 | Rood et al. | |

FOREIGN PATENT DOCUMENTS

| | | |
|---|---|---|
| DE | 30 36 460 A1 | 4/1981 |
| EP | 0 378 381 A2 | 7/1990 |
| EP | 0 394 449 A1 | 10/1990 |
| JP | 58-146446 | 9/1983 |

* cited by examiner

*Primary Examiner*—Stuart Hendrickson
(74) *Attorney, Agent, or Firm*—Laurence a. Greenberg; Werner H. Stemer; Ralph E. Locher

(57) ABSTRACT

Porous carbon fibers, whose active centers are formed by pores that are filled at least in part by carbon and/or metal and/or metal carbide, obtainable by carbonization of organic or inorganic polymers, the use thereof for the adsorption or separation of gaseous substances, in particular of $CO_2$, and also a method for the production thereof. First, a spinning mixture containing polyacrylonitrile-based polymer A and an organic or metallo-organic polymer B is produced. Next, the spinning mixture is spun to form mixed fibers of polymer A and polymer B. The mixed fiber is stabilized by oxidation. This is followed by carbonization or graphitization of the mixed fiber under non-oxidizing conditions in such a way that the polymer B forms a carbon and/or metal and/or metal carbide residue of at least 22 wt %, the residue forming active centers.

18 Claims, No Drawings

METHOD OF PRODUCING CARBON FIBERS, AND METHODS OF MAKING PROTECTIVE CLOTHING AND A FILTER MODULE

CROSS-REFERENCE TO RELATED APPLICATIONS

This application is a divisional of application Ser. No. 10/463,018, filed Jun. 17, 2003; the application claims the priority, under 35 U.S.C. §119, of German patent application DE 102 26 969.6, filed Jun. 17, 2002; the prior applications are herewith incorporated by reference in their entirety.

BACKGROUND OF THE INVENTION

Field of the Invention

The invention relates to porous carbon fibers, in particular for the adsorption or separation of gaseous substances, and also to methods for the use and production thereof and of making protective clothing and a filter module.

The production of carbon fibers by surface treatment of carbon fibers has been known for a relatively long time. Generally, precursor materials of polyacrylonitrile (PAN) or pitch are preferably used because of the good mechanical and adsorption properties of the carbon fibers that can be obtained therefrom. The production of activated carbon fibers based on polyacrylonitrile precursors begins with the stabilization in air at approximately 230-300° C. that is standard for carbon fibers. Chemical transformation of the polyacrylonitrile forms an infusible fiber. The resultant oxidized fiber can be activated directly or, more frequently, first processed further to form a textile structure. Heating the fibers to temperatures above approximately 1200° C. activates them. However, in contrast with the process for conventional carbon fibers, the activation is not carried out in an inert atmosphere, but in an oxidizing one. Typical oxidizing agents of this process step are $H_2O$ or $CO_2$. The reaction of the oxidizing agents results in a strong attack on the surface of the fiber, whereby a porous surface is formed. The size of the specific surface area and the configuration of the carbon atoms within the surface pores substantially determine the selectivity and strength of adsorption of chemical substances by the activated carbon fiber. The activation of the carbon fibers that are produced based on pitch precursors is effected in a similar manner by surface oxidation of the carbonized fiber.

The production of membranes with a particularly high specific surface area using porous fibers is described in European Patent Application EP 0 394 449 A1, which corresponds to U.S. Pat. No. 5,089,135. The membranes are formed by porous hollow carbon fibers. The production method provides for spinning polymer mixtures of PAN-based polymer A and (pyrolyzable) polymer B (i.e. a polymer that can be decomposed by heat), if applicable with a solvent and solubilizer, to form hollow polymer fibers. The hollow form is achieved, for example, by the use of slotted nozzles, with the inside diameter of the fibers being a few 100 µm. The porosity of the hollow fibers is established by the decomposition of the polymer B. The polymer B is decomposed at temperatures below 600° C. In particular, vinyl and methacrylate polymers are listed as the polymers. Their specific viscosity is specified as being preferably in the range of 0.1 to 0.4.

U.S. Pat. No. 6,364,936 B1 to Rood, et al. describes the set-up of an adsorption/desorption module of activated carbon fibers. One or more hollow elements of activated carbon fiber fabric is/are configured lengthwise. The fiber elements are heated directly by electric current in order to be able to carry out selective adsorption of constituents from the gas stream and the subsequent desorption thereof.

SUMMARY OF THE INVENTION

It is accordingly an object of the invention to provide porous carbon fibers and related methods for the use and production thereof and of making protective clothing and a filter module that overcome the hereinafore-mentioned disadvantages of the heretofore-known devices of this general type and that increase the specific surface area, the activity, and the selectivity of the carbon fibers.

With the foregoing and other objects in view, there is provided, in accordance with the invention, porous carbon fibers including pores of carbon fibers filled at least in part, that is, to at least 30% by volume, by active substances. The active substances are formed by carbon, metals and/or metal carbides originating from the carbonization of organic or metallo-organic polymers that are already present in a finely distributed manner in the precursor fiber for the production of carbon fibers. Accordingly, the carbon fibers are activated by producing pores that are partly filled with carbon, metal, and/or metal carbide. These active centers are formed by the carbonization of particles of an organic or metallo-organic polymer that are distributed in the carbon precursor fiber formed by polyacrylonitrile polymer. In a particularly advantageous way, the production method for carbon fibers described at the beginning does not need to be changed substantially for this. The carbon fibers in accordance with the invention are suitable in particular for the adsorption or separation of gases.

With the objects of the invention in view, there is also provided a method that provides for mixed polymers from a polyacrylonitrile-based (PAN-based) precursor for carbon fibers (polymer A) and a carbonizable polymer (polymer B) to be spun to form mixed fibers. Next, the mixed fibers are stabilized. Then the fibers are carbonized to form the finished activated carbon fibers. The polymer B is selected with regard to its solubility and particle size so that it is present in the PAN-based fiber in a finely distributed or microdispersed manner. When carbonization takes place, the framework of the carbon fiber is established from the PAN-based portion, while the decomposition product of the polymer B remains (behind) as a highly porous and active material and forms pores that are filled at least in part in and on the carbon fiber. Depending on the initial composition of the polymer B, different carbon residues, metals or metal carbides that have differing selectivities with respect to different adsorbates can also be obtained in this way.

In contrast with the prior art that has been mentioned, it is important that the polymer B is only partly decomposed so that its solid and non-volatile residue remains as an active substance in the fiber. The active centers of the activated carbon fibers are thus substantially formed by the solid decomposition products of the polymer B. As a result of the choice of the polymer B, in particular in connection with metallo-organic constituents or heteroatoms, different selectivities can be introduced into the activated fiber for specific purposes.

In particular, the method in accordance with the invention provides a method of producing porous carbon fibers with the following steps:

a) producing a spinning mixture containing a polyacrylonitrile-based polymer A and a carbonizable organic polymer B, the polymer B having an original mass and being carbonizable under non-oxidizing conditions to leave behind a solid non-volatile residue of at least 22% of the original mass;

b) spinning the spinning mixture to form fibers of polymer A with finely dispersed polymer B therein;

c) stabilizing the fibers by oxidation; and d) carbonizing or graphitizing the fibers under non-oxidizing conditions, whereas a solid non-volatile residue of at least 22% of the original mass from the polymer B is formed;

wherein the polymer B is selected from polymers which, upon carbonization, form a residue in percent of the original mass below the carbonization residue of the polyacrylonitrile-based polymer A, and which have a melting point above a process temperature at which the fiber is oxidized in step c).

Other features that are considered as characteristic for the invention are set forth in the appended claims.

Although the invention is described herein as embodied in activated carbon fibers and related methods for the use and production thereof and of making protective clothing and a filter module, it is, nevertheless, not intended to be limited to the details described because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying examples.

DESCRIPTION OF THE PREFERRED EMBODIMENTS

The PAN-based polymers that are usual in the market for the production of carbon fibers, also called precursors, are used as the polymer A. Typically, they are synthesized as copolymers from over 90 mol % acrylonitrile units and further comonomer units.

A carbonizable organic or metallo-organic polymer, whose carbonization residue is at least 22 wt % and preferably over 30 wt %, is used as the polymer B. What is to be understood by the carbonization residue is that residue of the polymer B in wt % that results under the conditions of carbonization treatment of the corresponding mixed fiber. These are temperatures above 500° C. under non-oxidizing conditions.

The carbonization residue of the polymer B preferably is below that of the PAN-based polymer. If the more intensive pyrolysis in the case of polymer B results in a greater volume shrinkage than in the case of the precursor material of polymer A, then opened pores are formed as a result. Particularly preferably, however, polymers B are used that show a comparatively small shrinkage in volume in the case of carbonization. As a result, the regions of carbonized polymer B remain microporous and increase the specific surface area of the fiber in an advantageous manner. The pores in the carrier fiber are at least in part filled by the generally microporous decomposition products of the polymer B. The pores are preferably filled to at least 30% by volume and particularly preferably to at least 50% by volume with the decomposition products that are, if applicable, microporous.

The polymer B content typically lies below 50 wt % of the polymer mixture of A and B and preferably in the range of 3 to 40 wt %.

The precondition for the formation of discrete regions of residues of the carbonization of polymer B is that the polymer B is already present in the mixed fiber in a finely dispersed or microdispersed manner. The particle size of the polymer B should not exceed 50% of the fiber diameter of the resulting mixed fiber. The average diameter of the individual particles of the polymer B preferably lies below 1500 nm and particularly preferably below 800 nm. The partly filled pores formed after the carbonization of the fibers should not have less than an average minimum diameter. This minimum diameter is approximately 30 nm.

A microdispersed distribution is guaranteed in particular if the polymer B has a low level of solubility or no solubility at all in the PAN spinning solution. Usual PAN spinning solutions for the wet or dry spinning process contain solvents. In accordance with the invention, polymers B that are insoluble in the solvent used are therefore preferred. The polymers B are to have a melting point above the process temperature of the oxidization of the mixed fiber. Resins or polymers that cross-link to form infusible compounds are preferred. Examples of suitable organic polymers B are inter alia polyesters, phenolic resins, polyamides, polyaramides, copolyaramides, para-aramides, or cellulose.

By metallo-organic polymers are to be understood such compounds in which metallic atoms are incorporated directly into the polymer chain and also those in which the metallic atoms are bound in a complex manner, in particular to heteroatoms, such as O or N. In particular, carboxyl, carbonyl, and imine groups crop up in the latter case. For the purposes of the invention, complex organic metal salts that are present in an aggregated and high-molecular form also can number among the metallo-organic polymers. Polyacetates, polymeric cyclopentadienyls or polymeric alcoholates, or acetylacetonates inter alia number among the metallo-organic polymers in accordance with the invention.

Preferred metal constituents of the metallo-organic polymers are the transition metals, in particular of the first series, and the platinum metals. These are distinguished by high chemical activity in atomic form or as a carbide compound and establish a high and in part very selective adsorption capacity. Metallo-organic compounds or complex organic compounds of the elements Ti, Cr, W, Fe, Co, Ni, Pd, and Pt are particularly preferred.

In accordance with a further advantageous embodiment of the invention, the metallo-organic polymer B also can contain further metal in elementary form, whereby the active region content of the fiber can be further increased. Resin-bonded metal micropowders of the elements Ti, Cr, Fe, or Pt are preferably used in this connection.

The carbonization residue of the metallo-organic compounds typically includes a mixture of carbon, metal, and metal carbide in a varying composition. The carbonization residue of the compound used is preferably over 25 wt %, particularly preferably above 35 wt %.

When the mixture is spun to form mixed fibers of polymer A and polymer B the known methods of wet or dry spinning can be applied. In particular when spinning mixtures are used that contain metallo-organic polymer B in the form of complex organic salts, dry-spinning is preferred. By comparison, in the case of wet spinning there is the risk that the spinning bath (coagulating solution) will increasingly dissolve metal compounds back out of the fiber.

The fiber diameter of the mixed fibers in accordance with the invention after the spinning process is below 200 µm, with the range between 10 to 30 µm, which is usual for PAN fibers as precursor material for conventional carbon fibers, being preferred. Thick fibers above approximately 60 µm are, if applicable, also to be constructed as profiled fibers, since in this way their surface area is further enlarged.

In the next process step of stabilization, the mixed fibers are rendered infusible. This occurs by oxidation at temperatures of preferably 230 to 300° C. In a known way, as a result of dehydration and cyclization at a molecular level, stabilization of the polyacrylonitrile takes place that renders the polymer infusible and carbonizable.

At least after this process step, the polymers B are also present in an infusible form. If applicable, the cross-linkage of the polymer B that leads to the stabilization likewise first takes place in this method step. Subsequent cross-linkage is observed, for example, in the case of polyesters or phenolic resins. A preferred form of heat treatment for the stabilization provides for heating in air to 230° C. with a holding time of approximately 140 minutes at a heating rate of approximately 5° C./minute. Shorter process times can be rendered possible by higher temperature levels, for example approximately 60 minutes at approximately 270° C. If metallo-organic compounds are used as the polymer B, an isothermal temperature profile at the lowest possible temperature is to be preferred, because overheating of the fiber under oxidizing conditions is to be avoided, since there is a risk of oxidation of the metallo-organic compounds to form metal oxides that are generally undesired.

In the last step of the fiber production, conversion of the stabilized mixed fiber into the activated carbon fiber takes place. This is achieved by carbonization or graphitization, with the difference between carbonization and graphitization being smooth (fluid). Carbonization takes place at temperatures that are preferably higher than 500° C., in particular in the range of 900 to 1400° C.; graphitization takes place at higher temperatures, in particular in the range of 1600 to 2200° C. Heat treatment is conducted under oxygen-free conditions, such as, for example, under an $N_2$ inert gas atmosphere.

At temperatures barely above 500° C., only partial carbonization of the precursor polymer takes place so that partly carbonized fibers are obtained. In contrast with the carbon fibers obtained in part at substantially higher carbonization temperatures, the partly carbonized fibers still have comparatively high contents of hetero-atoms, in particular of nitrile groups. The same applies analogously as well to the decomposition products of the polymer B, in so far as nitrogen-containing polymers were used as a basis. These nitrile groups as polar groups contribute to the overall activity of the fiber surface.

As a further advantage of the invention it is therefore possible in a simple way to produce activated partly carbonized fibers as well. Partly carbonized fibers have inter alia reduced thermal conductivity, as a result of which, they have an advantage in applications that demand good thermal insulation compared with the carbon fibers. Such partly carbonized fibers are also referred to collectively as carbon fibers in the following.

In the case of the use of metallo-organic polymers B, graphitization treatment promotes the formation of stable crystalline metal compounds, in particular of the metal carbides. In general, however, the activity, in particular of pure carbon regions, decreases as a result.

A further aspect of the invention is the use of the activated fibers to separate gas mixtures and to adsorb gaseous substances. In particular, the separation of $CO_2$ is considered in this connection. A typical configuration for separating gaseous substances, and in particular $CO_2$ as well, is set up out of two modules that alternately perform the function of adsorption, followed by desorption. The modules can then be heated in an advantageous manner by utilizing the electrical conductivity of the carbon fibers.

The set-up of filter modules, for example in the chemical industry, is designated as a further application. The fiber material can also be used as a component part of activated and, if applicable, thermally insulating protective clothing. As a result of the use of activated fibers, the protective clothing can perform the additional function of adsorption of harmful substances. For textile applications, the partly carbonized fibers have the advantage over the carbon fibers, since the textile processibility and the wear comfort of the clothing are clearly better.

We claim:

1. A method of producing porous carbon fibers, which comprises the following steps:
    a) producing a spinning mixture containing a polyacrylonitrile-based polymer A and a carbonizable organic polymer B, the polymer B including a metallo-organic polymer, having an original mass, and being carbonizable under non-oxidizing conditions to leave behind a solid non-volatile residue of at least 22% of the original mass;
    b) spinning the spinning mixture to form fibers of polymer A with finely dispersed polymer B therein;
    c) stabilizing the fibers by oxidation; and
    d) carbonizing or graphitizing the fibers under non-oxidizing conditions, whereas a solid non-volatile residue of at least 22% of the original mass from the polymer B is formed;
    wherein the polymer B is selected from polymers which, upon carbonization, form a residue in percent of the original mass below the carbonization residue of the polyacrylonitrile-based polymer A, and which have a melting point above a process temperature at which the fiber is oxidized in step c).

2. The method according to claim 1, wherein the polymer B includes an organic polymer selected from the group consisting of a polyamide, a copolyaramide, a para-aramide, a polyaramide, a phenolic resin, a polyester, and a cellulose.

3. The method according to claim 1, wherein the metal constituents in the metallo-organic polymers are selected from the group consisting of Al, B, Si, Ti, Cr, Fe, Go, Ni, W, Pd, and Pt.

4. The method according to claim 1, wherein the metallo-organic polymer is selected from the group consisting of metallo-organic a cyclopentadienyl and a metallo-organic polyacetate.

5. The method according to claim 1, which further comprises heating to temperatures above 500° C. during step d).

6. The method according to claim 1, which further comprises maintaining a temperature from 230 to 300° C. during step c).

7. The method according to claim 1, wherein step b) includes dry spinning to form the mixed fiber.

8. The method according to claim 1, wherein the polymer B in the mixed fiber is a precipitate having an average size below 1500 nm.

9. The method according to claim 1, wherein polymer B is a thermoplastic first stabilized by step c).

10. The method according to claim 1, wherein polymer B is a thermoplastic first rendered infusible by step c).

11. The method according to claim 1, wherein:
    the mixed fiber has a mass; and
    the polymer B amounts to 3 to 50% of the mass of the mixed fiber.

12. The method according to claim 1, wherein the carbonization residue of polymer B is at least 30% of its original mass.

13. The method according to claim 1, wherein the diameter of the fibers after spinning is below 200 μm.

14. The method according to claim 1, wherein the particle size of the finely dispersed polymer B does not exceed 50% of the diameter of the fiber.

15. The method according to claim 1, wherein the average particle diameter of polymer B is below 1500 μm.

16. The method according to claim 1, which comprises further processing the fibers to produce a filter module.

17. The method according to claim 16, which comprises passing a gas mixture including $CO_2$ through the filter module to separate the $CO_2$ from the gas mixture.

18. The method according to claim 1, which comprises further processing the fibers to produce protective clothing with the fibers.

* * * * *